E. P. FRENCH.
Bee Hive.
No. 20,202. Patented May 11, 1858.
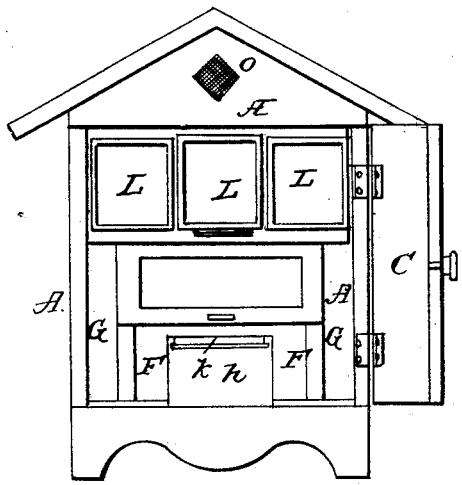
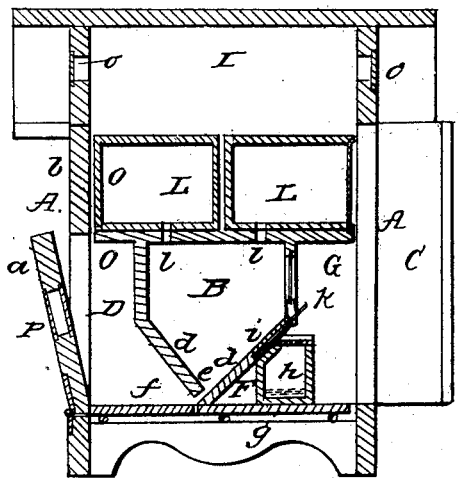
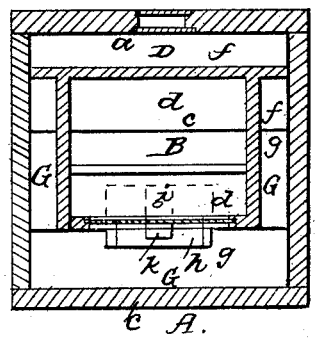
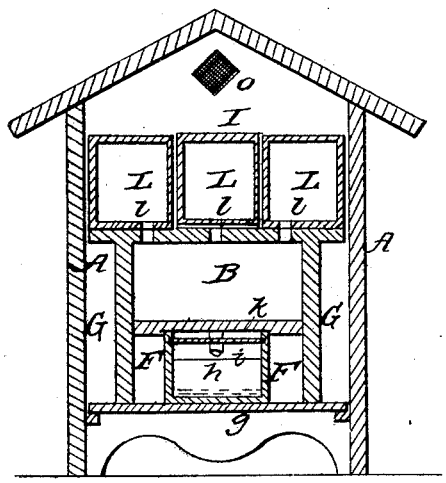
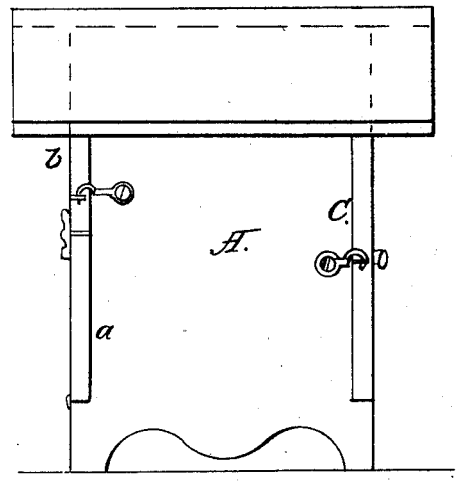

UNITED STATES PATENT OFFICE.

E. P. FRENCH, OF NASHUA, NEW HAMPSHIRE.

BEEHIVE.

Specification of Letters Patent No. 20,202, dated May 11, 1858.

*To all whom it may concern:*

Be it known that I, EDWARD P. FRENCH, of Nashua, in the county of Hillsboro and State of New Hampshire, have invented an Improved Beehive; and I do hereby declare that the same is fully described and represented in the following specification and the accompanying drawings, of which—

Figure 1, is a front elevation of such hive. Fig. 2, a vertical, central and longitudinal section of it. Fig. 3, a transverse section of it. Fig. 4, a horizontal section of the hive the same being taken just above the feeding box. Fig. 5, is a side elevation of the hive.

In such drawings, A, denotes the outer case of the hive, it having the form therein represented and being open at its two ends where it is provided with doors which are shown respectively at $a$, $b$, and $c$. Within the said case A, there is arranged as shown in Fig. 2, a main chamber B, the lower part of whose opposite sides are curved or inclined downward toward one another as shown at, $d$, $d$, in said figure and toward a long slit or entrance passage $e$, which opens into the rear part of an air space or exercising chamber D, whose bottom board is arranged so as to be capable of being slid forward, when the door $a$, is open, the same being so as to make a passage out of the hive, and directly under the opening, $e$, such passage being for the discharge of dirt which may fall from the main chamber and through the opening $e$, and lodge upon the bottom board $f$. The purpose of the board $f$, beyond that described is to constitute a platform for the bees to rest and light upon while passing either toward or away from the entrance $e$, of the main or breeding chamber B. When the doors $a$, $b$, are closed, or when the former is closed, the bottom board $f$, will be forced close up against the remainder $g$, of the bottom of the hive.

In rear of the main chamber and formed in part by the slope of its rear portion $d$, is a chamber F, for the reception of a feeding box $h$, which opens directly into the main chamber by means of a passage $i$, having a closing slide $k$, applied to it. Furthermore, the said chamber F, opens into a warm air chamber G, G, G, which extends in rear of the chamber F, and the main chamber and embraces two opposite sides of the main chamber as shown in Figs. 2, 3, and 4. This chamber G, is completely insulated from the exercising chamber and the space I, which is disposed over a series of secondary chambers or honey boxes L, L, L, &c., arranged directly on the main chamber, each having a communication therewith as shown at $l$.

From the exercising chamber a narrow passage $o$, leads upward in rear of the door $b$, and between it and the front ends of the honey boxes L, L, L, and forms a communication between the exercising chamber D, and the space I, over the honey boxes. Either one or both ends of the space I, may be furnished with one or more ventilators $o$, while there is a similar ventilator $p$, placed in the door $a$, the same being to enable a current of air to pass into the exercising chamber and thence upward through the passage in rear of the door $b$, and from thence into the space I, out of which it will escape by either one or both ventilators. Each ventilator consists of a hole or passage made through the door or the end of the space I, and covered by wire gauze or a foraminous plate. The warmth of the walls or sides of the chamber B, will cause such current of air to enter the exercising chamber and move upward through the passage $o$. More or less of it will find an entrance into the breeding chamber B, while the carbonic acid gas generated therein, will sink down and be carried off by the said air current.

The arrangement of the feeding chamber F, is such that the bees in order to feed, must first pass through the main chamber, and from it into the feeding chamber, such arrangement serving to protect the feeding chamber from bees not belonging to the hive.

I am aware that it is not new to place a feeding chamber in front of the hive or the end thereof; also that it is not new to arrange a feeding chamber in one of the secondary chambers or honey boxes. I do not claim such, as in the one case, the feed chamber is exposed to robber bees, while in the other it is arranged in an inconvenient manner and is objectionable in many respects.

I claim—

Making the lower part or both sides of the main chamber B, inclined toward the orifice of entrance $e$, in combination with the arrangement of an exercising and entrance chamber D, chamber F, feeding box $h$, warm air spaces G, G, G, and air or ventilating passage $o$, leading from the exercising chamber D, upward against the front sides of the secondary chambers and over their tops into the chamber I, the main chamber communicating with said passage only by means of orifice e, at its bottom, whereby the main and secondary chambers are kept warm and at the same time relieved of bad air or carbonic acid gas by a ventilating current of air induced by their heat as described, the several parts being arranged as respects each other and constructed as described, for the purpose set forth.

In testimony whereof I have hereunto set my signature.

E. P. FRENCH.

Witnesses:
E. P. EMERSON,
A. W. SAWYER.